Nov. 2, 1948.  A. F. PIKE  2,452,789
TRAILER

Filed June 11, 1945  2 Sheets-Sheet 1

Inventor
Albert F. Pike
E. V. Hardway,
Attorney

Nov. 2, 1948.  A. F. PIKE  2,452,789
TRAILER

Filed June 11, 1945  2 Sheets-Sheet 2

Inventor
Albert F. Pike
By
E. J. Hardway
Attorney

Patented Nov. 2, 1948

2,452,789

UNITED STATES PATENT OFFICE 2,452,789

TRAILER

Albert F. Pike, Houston, Tex.

Application June 11, 1945, Serial No. 598,809

3 Claims. (Cl. 280—33.05)

This invention relates to a trailer.

The trailer herein described has been specially designed for transporting heavy loads and the principal object of the invention is to provide a trailer of the character described which is equipped with a loading and unloading ramp.

Another object of the invention is to provide a trailer of the character described having a loading and unloading ramp which may be converted into a hitch for connecting the trailer to the tractor.

While the type of trailer herein described has been specially designed for hauling very heavy loads it is capable of general use and may be employed, also, for transporting loads of any character.

With the above and other objects in view the invention has particular relation to certain novel features of construction, arrangement of parts and use, an example of which is given in this specification and illustrated in the accompanying drawings, wherein.

Figure 1:
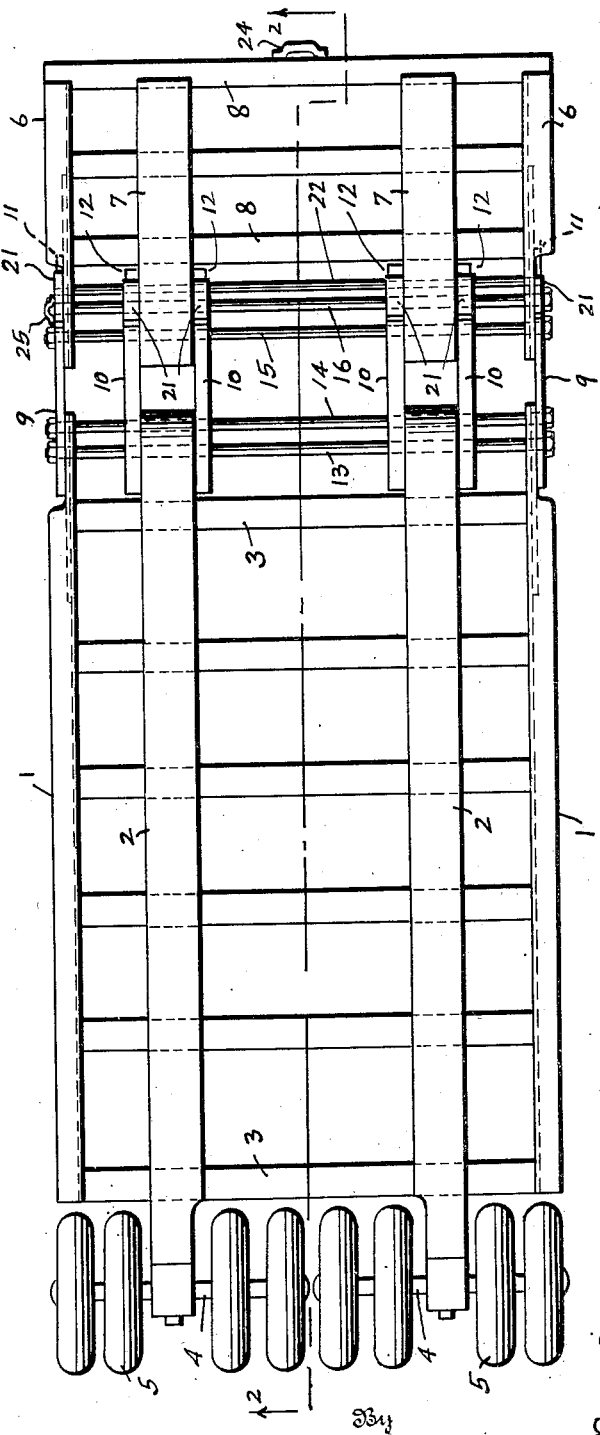
Figure 1 is a plan view of the trailer with the flooring removed.

Referring now more particularly to the drawings, wherein like numerals of reference designate the same parts in each of the figures, the numerals 1, 1 shows the side members of the main frame and the numerals 2, 2 show the intermediate, longitudinal members of said frame. The side members 1 are preferably of channel shape with their flanges extended outwardly and the intermediate members 2 are preferably H-beams.

The framework also has the cross bars 2 which may be suitably welded to the side members 1 and the intermediate beams 2.

As shown the intermediate beams are extended rearwardly forming anchors for the rear axles 4, 4 on which the ground wheels 5 are mounted to rotate.

At the forward end of the trailer there is the supplemental, or ramp, frame comprising the side members 6, 6 and the intermediate beams 7, 7 similar to and aligned with the corresponding parts of the main frame and anchored together by the transverse, cross bars 8. The main and supplemental frames are preferably formed of metal of the required strength and the parts are preferably welded together.

The main frame and supplemental frame are connected by the upper and lower series of links, the side links of the upper series being designated by the numerals 9, 9 and the intermediate links being designated by the numerals 10, 10.

The links of the lower series are substantially similar to the links of the upper series and are arranged bneath them. The links of the lower series are indicated generally by the numerals 11, 11 and 12, 12.

Figure 2:
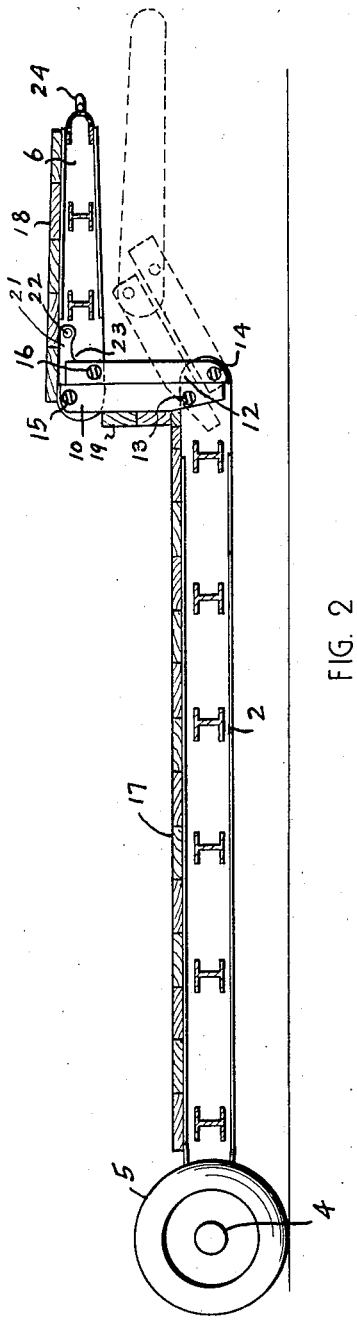
Figure 2 is a longitudinal, sectional view taken on the line 2—2 of Figure 1 showing the trailer in traveling position and with the flooring shown on the framework.

The rear ends of the respective upper and lower series of links are connected to the forward ends of the side members 1 and intermediate members 2 by means of the respective upper and lower cross rods 13 and 14. These rods extend through the forward ends of the frame members 1 and 2 and the cross rod 14 is arranged slightly forwardly of the cross rod 13 as shown in Figures 1 and 2. The pairs of links 10, 10 and 12, 12 are arranged on opposite sides of the corresponding intermediate members 2 and 7, as shown in Figure 1, and their rear ends are pivoted on the respective cross rods 13 and 14. The upper and lower links 9, 11 are arranged on the outer sides of the corresponding side members 1 and 6, at each side, and their rear ends are pivoted on said cross rods 13 and 14.

The forward ends of the links of said upper and lower series are pivoted on the cross rods 15 and 16. These rods extend through the rear ends of the supplemental frame members 6 and 7. The rods are maintained against detachment by heads on one end and nuts on the other end, as shown in Figure 1, and the rod 16 is slightly in front of rod 15.

The main frame of the trailer is provided with suitable flooring as 17 and the supplemental frame is provided with flooring 18. The upper series of links 9 and 10 should also be provided with transverse floor boards 19.

It is therefore, apparent that wehn the ramp is moved to loading or unloading position there will be a substantially continuous flooring from the main flooring 17 of the trailer down to the ground surface or other loading platform over which the heavy loads may be readily moved.

While loading or unloading the tractor will be disconnected from the trailer and the forward end of the main frame may be supported on a transverse beam 20, or other selected support.

When it is desired to move the trailer the ramp should be moved to traveling position, that is to the position shown in Figure 2. The upper and lower series of links will then be in vertical position with the lower series of links 11, 12 resting against the upper series of links, as shown in Figure 1. The ramp is latched in said position by means of a series of latches as 21. The series of latches are fixed on a transverse rod 22. These latches 21 extend rearwardly and overlie the upper ends of the links 11, 12 and are provided with the rearwardly facing shoulders 23 which engage against the forward sides of said upper ends. The ramp assembly is thereby locked in traveling position.

The forward cross bar 8 of the supplemental frame is provided with a suitable fixture 24 for connecting the tractor to the trailer.

When it is desired to load or unload the tractor may be detached and the latches 21 lifted to disengage the links 11, 12. For the purpose of disengaging the latches one of the end latches has grip member 25 by means of which the rod 22 may be partially rotated to lift, and thus disengage, all of the latches and the ramp may then be lowered to the position shown in Figure 3. The series of upper links 9 and 10 will then rest on the corresponding links 11 and 12 of the lower series, as shown in Figure 3, to give strength to the ramp.

Figure 3:
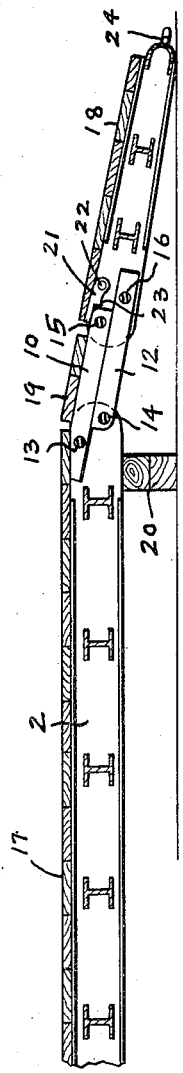
Figure 3 is a fragmentary, longitudinal, sectional view showing the trailer in loading and unloading position.

The upper sides of the rear ends of the links 9, 10 are beveled off, as shown in Figure 3, so as not to be interfered with by the main flooring when the ramp is lowered to loading or unloading position.

The drawings and description are illustrative merely while the broad principle of the invention will be defined by the appended claims.

What I claim is:

1. A trailer comprising, a main frame, a supplemental frame, upper and lower series of links pivoted at one end to the main frame and at their other ends to the supplemental frame, flooring on the frames and the upper series of connecting links and forming load supporting surfaces, said supplemental frame being movable to declining position to form a loading and unloading ramp and being movable to elevated position to form a tractor hitch and releasable latches on the supplemental frame engageable with the lower series of links when the supplemental frame is in elevated position to lock said supplemental frame in said position.

2. A trailer comprising, a main frame, a supplemental frame, upper and lower series of links pivoted to the respective frames whereby the supplemental frame may be moved to declining position with the upper series of links resting on the lower series of links, said supplemental frame being movable to elevated position to form a tractor hitch, said links being so arranged that the lower series of links will rest against the upper series of links when said supplemental frame is in said elevated position, releasable means for locking said supplemental frame in said elevated position.

3. A trailer comprising, a main frame, a supplemental frame, upper and lower series of links pivoted to the respective frames whereby the supplemental frame may be moved to declining position with the upper series of links resting on the lower series of links, said supplemental frame being movable to elevated position to form a tractor hitch, said links being so arranged that the lower series of links will rest against the upper series of links when said supplemental frame is in said elevated position, releasable means for locking said supplemental frame in said elevated position and flooring on said frames and links forming load supporting surfaces.

ALBERT F. PIKE.

REFERENCES CITED

The following references are of record in the file of this patent:

UNITED STATES PATENTS

| Number | Name | Date |
|---|---|---|
| 2,131,949 | Helmig | Oct. 4, 1938 |